US006250555B1

United States Patent
Inamoto

(10) Patent No.: US 6,250,555 B1
(45) Date of Patent: Jun. 26, 2001

(54) CARD WITH BUILT-IN ELECTRONIC PART AND PRODUCTION PROCESS THEREOF

(75) Inventor: Tadayoshi Inamoto, Hachioji (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/399,965

(22) Filed: Sep. 20, 1999

(30) Foreign Application Priority Data

Sep. 22, 1998 (JP) .................................................. 10-268372

(51) Int. Cl.⁷ .................................................. G06K 19/00
(52) U.S. Cl. ............................................ 235/487; 235/492
(58) Field of Search .................................... 235/487, 492

(56) References Cited

U.S. PATENT DOCUMENTS 6,025,119 * 2/2000 Majumdar et al. .................. 430/529

FOREIGN PATENT DOCUMENTS

| 54-059936 | 5/1979 | (JP) . |
| 58-096592 | 6/1983 | (JP) . |
| 1-043826 | 2/1989 | (JP) . |
| 2-557356 | 8/1997 | (JP) . |

* cited by examiner

Primary Examiner—Harold I. Pitts
(74) Attorney, Agent, or Firm—Fitzpatrick, Cella, Harper & Scinto

(57) ABSTRACT

Disclosed herein is a card with a built-in electronic part, in which an ink-receiving layer is provided on at least one side of the card, and an electronic part is mounted in a recess formed in the surface of the card, wherein the ink-receiving layer contains an inorganic filler.

11 Claims, 4 Drawing Sheets

CARD WITH BUILT-IN ELECTRONIC PART AND PRODUCTION PROCESS THEREOF

BACKGROUND OF THE INVENTION

1. Field of the Invention

The present invention relates to an IC (integrated circuit) card with a built-in IC chip, particularly, a card with a built-in electronic part, which is suitable for use as a credit card, bank card, prepaid card, patient's registration card, membership card or the like, and a production process thereof.

2. Related Background Art

Various kinds of information have heretofore been stored in cards such as credit cards, bank cards, prepaid cards, patient's registration cards and membership cards. As a method for recording information, there is used the so-called optical card system in which information is digitized, and magnetism, bar code or laser beam is used to volatilize out a part of an optical recording layer on an information recording medium, or to cause a change in reflectance of the optical recording layer, or to cause deformation thereof, thereby recording and reproducing the information by an optical difference in reflectance or transmittance. Besides, embossing in which recesses and projections are formed in and on a card, and characters and numerals are expressed by the projections, or general printing such as screen printing or offset printing may also be used as a method for recording information.

In recent years, IC cards called chip cards, memory cards, microcomputer cards or electronic cards, in which an IC chip has been mounted, have begun to be used.

Such IC cards have a great storage capacity compared with the conventional cards using magnetism or bar code, and so it is attempted to store account data in place of bankbooks in bank connections, and data of transactions such as shopping in credit connections in these IC cards. They are also used as oil cards for gas stations and are put to practical use in not only the transaction data but also various services.

However, the data are not directly visible to the naked eyes in magnetic recording and bar codes, in which the information is digitized and stored, or optical cards. It is therefore difficult to check the information stored in the card as to whether the information is truly that as to its owner or not.

Printing of matters to be attended to use, codes, etc. by character information, and printing of logo, underground pattern, design, etc. are generally performed by general printing such as screen printing or offset printing. However, such printing requires to make plates corresponding to the number of colors used in the printing, and so it is difficult to make them in a short period of time. In addition, the unit cost of production becomes very high in small-quantity production. Such printing is limited to uniform information, and individual information is separately recorded by the above-described digital data under circumstances.

It is partially practiced to record individual information, for example, a portrait of the owner of a card on the card.

However, it is difficult to make the card in a short period of time by a method comprising sticking a photograph itself on the card. Such a method is also high in cost.

A method using sublimate type thermal transfer printing involves a drawback that the cost of an ink ribbon is high, and running cost thus becomes high. When full-color printing is performed in particular, it is not economical because ink ribbons of 3 colors of yellow, magenta and cyan are always consumed irrespective of optical density. Since the ink ribbon is in the form of a thin film, it may have been damaged in some cases by lack of experience when it has been installed in a printer. There has been also a limitation that a material of a base on which printing is performed must be selected from those fit for the sublimate type thermal transfer printing. In addition, a printing head is of a contact type that it comes into contact with a printing surface through an ink ribbon. Therefore, a fine print may not be provided due to delicate irregularities on the printing surface, or the ink ribbon is not brought into fully close contact with the printing surface when foreign matter such as dust is present on the surface of a card, so that printing failure may occur in some cases. Further, it is generally not practiced to conduct printing up to the end of a card, since the printing head has a possibility of coming into contact with the edge face of the card and hence of its being damaged. Therefore, a blank is provided at the edge face of the card.

As a method for solving these problems, there is investigated a method comprising providing an ink-receiving layer on the surface of a card and conducting printing thereon by an ink-jet system as described in Japanese Patent Application Laid-Open Nos. 58-96592 (1983) and 1-43826 (1989). According to this method, the above-described problems can be avoided because a printing head is of a non-contact type.

As a method for fabricating an IC card, there is a method in which a recess for mounting an IC module is provided in the surface of a card by machining, and the IC module, on which necessary mounting has been made, is then joined. This method is described in Japanese Registered Utility Model Publication No. 2557356. When a card on which an ink-receiving layer has been provided is used to fabricate an IC card by such a method, however, there are involved problems that the ink-receiving layer cannot be finely machined to cause burr, and a resin component in the ink-receiving layer adheres to a working tool when the machining is continuously conducted, and so reduction of machining speed and lowering of machining accuracy are incurred. Therefore, deburring is required as post working, and tooling must be frequently conducted. Therefore, this process cannot choose but become a process low in productivity. Therefore, it has been unavoidable for the cost of the card to increase. The above publication dose not describe anything about the provision of the ink-receiving layer, so that no method for solving this problem is described.

SUMMARY OF THE INVENTION

It is an object of the present invention to provide a card with a built-in electronic part, which has an ink-receiving layer for printing information by ink-jet recording, and does not cause the problems that burr occurs in the ink-receiving layer when a recess for mounting an electronic part is provided in a card by machining, and a resin component in the ink-receiving layer adheres to a working tool, and to provide a production process thereof.

The above object can be achieved by the present invention described below.

According to the present invention, there is thus provided a card with a built-in electronic part, in which an ink-receiving layer is provided on at least one side of the card, and an electronic part is mounted in a recess formed in a surface of the card, characterized in that the ink-receiving layer contains an inorganic filler.

According to the present invention, there is also provided a process for producing a card with a built-in electronic part comprising the steps of providing an ink-receiving layer containing an inorganic filler on at least one side of the card, carrying out a cutting from a surface of the ink-receiving layer on the card to form a recess, and mounting an electronic part in the recess.

According to the present invention, there can be provided cards with a built-in electronic part, which have an ink-receiving layer for printing information by ink-jet recording, and does not cause problems that burr occurs in the ink-receiving layer when a recess for mounting an electronic part is formed in a card by machining and that a resin component in the ink-receiving layer adheres to a working tool.

DESCRIPTION OF THE PREFERRED EMBODIMENTS

As a card base used in the IC card according to the present invention, there may be used various kinds of bases according to the purpose of use. Examples of materials usable for the base include paper; polyester resins such as polyethylene terephthalate, noncrystalline polyester resins (resins having the following structural formula (1); PETG, trade name, product of Eastman Chemical Co.) and polybutylene terephthalate; resins such as polyvinyl chloride resins, polyvinylidene chloride resins, epoxy resins, polycarbonate resins, polyethylene resins, polypropylene resins, polystyrene resins and ABS resins; polymer alloys of these resins; and metals.

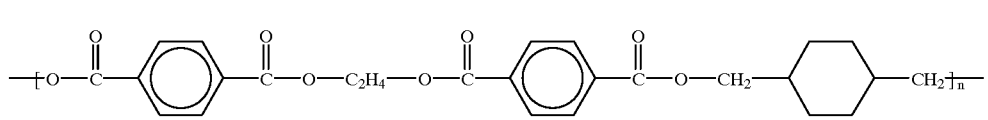

(1)

Magnetic stripes may be formed for recording of digital information in advance on one sides or both sides of these bases. Further, uniformly determined information such as logo, matters to be attended to use and codes may be printed in advance by screen printing, offset printing or the like.

Figure 1:
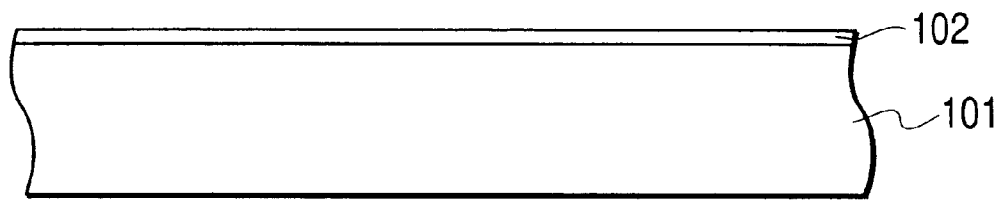
FIG. 1 is a cross-sectional view illustrating a partial section of a card base on which an ink-receiving layer has been provided.

The ink-receiving layer may be provided on one side or both sides of the base. FIG. 1 illustrates a partial section of a card base on which such an ink-receiving layer has been provided.

Incidentally, in respective drawings, reference numerals 101 or 201 and 102 or 202 indicate a card base and an ink-receiving layer, respectively.

As an inorganic filler which is a material comprised in the ink-receiving layer, silica gel, alumina, titanium oxide, calcium silicate, synthetic zeolite or zinc oxide may be utilized. As another ingredient comprised in the ink-receiving layer, a binder resin is used. Examples of the resin include polyvinyl alcohol or modified products thereof, starch or modified products thereof, gelatin or modified products thereof, casein or modified products thereof, gum arabic, cellulose derivatives such as carboxymethyl cellulose, hydroxyethyl cellulose and hydroxypropylmethyl cellulose, polyvinyl pyrrolidone, polyvinyl chloride, polyvinyl acetate, polyacrylates, polystyrene, and polyethylene. Namely, the ink-receiving layer may be a layer containing at least the inorganic filler and an organic resin, or a cured layer containing at least the inorganic filler and an organic resin.

The content of the inorganic filler in the ink-receiving layer is preferably within a range of from 40% by weight (hereinafter indicated merely by "%") to 98%, more preferably from 70% to 95%. If the content of the inorganic filler is too low, the ink-receiving layer cannot be finely machined to become liable to cause burr at the edge face of the machined portion when the card is machined through the ink-receiving layer. In addition, continuous machining tends to involve a problem that the resin component in the ink-receiving layer adheres to a working tool, and so reduction of machining speed and lowering of machining accuracy are incurred. Therefore, deburring is required as post working, and tooling must be frequently conducted, so that the productivity of the production process becomes low. Since printing is made by absorbing inks in voids defined among constitutions of the inorganic filler, the ink absorbency of the resulting ink-receiving layer is deteriorated if the content of the inorganic filler is too low. If the content of the inorganic filler is too high on the other hand, the resulting ink-receiving layer tends to lower its mechanical strength. More specifically, the ink-receiving layer tends to undergo cracking or separation of the inorganic filler therefrom.

If necessary, into the ink-receiving layer, may be suitably incorporated pigment dispersants, thickeners, antifoaming agents, foam suppressors, optical whitening agents, ultraviolet absorbents, antioxidants, mildewproofing agents, etc.

When these materials are applied to the base, the resin component is dissolved in a proper solvent, and the inorganic filler is finely dispersed therein to prepare a coating formulation. Alternatively, the inorganic filler may be dispersed in the resin, and the dispersion may be charged together with the base into a mold to mold it.

As the most preferable method, may be mentioned a method in which these materials are dispersed in a solvent comprised mainly of water to use the resultant dispersion.

In the case where the materials are in the form of a dispersion, as a method for coating the base with the dispersion for an ink-receiving layer, may be used any of the generally performed coating methods such as blade coating, air-knife coating, roll coating, curtain coating, bar coating and spray coating methods.

The coating weight of the dispersion is preferably within a range of from 3 to 80 g/m$^2$, more preferably from 5 to 40 g/m$^2$ in terms of dry solids content. If the coating weight is too low, the ink absorbency of the resulting ink-receiving layer becomes insufficient, resulting in a failure to form a good-quality image. In order to form a single-color image, the coating weight is preferably at least 3 g/m$^2$. In order to form a multi-color image, the coating weight is preferably at least 5 g/m$^2$. In ordinary ink-jet recording, no problem arises about ink absorbency so far as an ink-receiving layer the coating weight of which is about 20 g/m$^2$ in terms of dry solids content is formed. When an image of high optical density is printed, or an ink low in concentration is applied in an amount more than the amount generally used in order to represent gradation, however, the ink-receiving layer preferably has a dry coat weight of about 20 to 80 g/m$^2$ in terms of dry solids content. If the coating weight is too high on the other hand, the coating process must be repeated many times, resulting in increase of cost.

After the coating of the ink-receiving layer, the base is dried by means of, for example, a hot-air drying oven or a heated drum to form the ink-receiving layer. At this time, when the base is comprised of a material having a low softening point, such as a vinyl chloride resin, the drying temperature is preferably 50 to 70° C.

When the ink-receiving layer is such that it is cured by heating, a heat-curing treatment is subsequently performed. When any number of card bases is fusion-bonded by heating to each other, fusion bonding by heating is subsequently performed. In the case where each base is comprised of a material having a low softening point, such as a vinyl chloride resin, as described above, the base has a possibility of being deformed if the fusion-bonding temperature is 100° C. or higher. In this case, it is effective to subject the card bases to a heat treatment while restraining them under pressure. The pressurization is preferably conducted by a means having a flat surface, such as a ferro plate because the surface profile of the pressurizing means is transferred to the base and ink-receiving layer. However, if it is intended to impart a specific surface profile such as a satin pattern to the surface thereof, it is only necessary to pressurize the card base by a means having a shape corresponding thereto. The pressure applied is determined according to the materials of the base and the ink-receiving layer. However, it is preferably within a range of from 0.1 to 20 Kg/cm$^2$, more preferably from 5 to 15 Kg/cm$^2$. If the pressure is too low, the pressurizing means cannot be brought into fully close contact with the base. If the pressure is too high on the other hand, the base is irreversibly deformed. It is hence not preferable to pressurize the base outside the above range.

According to a preferred embodiment of the IC card according to the present invention, an outermost layer comprising a porous layer containing particles of a thermoplastic resin is provided on the above-described ink-receiving layer, and the outermost layer is melted by a heat treatment after printing to make it non-porous, thereby shielding the ink-receiving layer from the air. Since the outermost layer is still in the state of particles, not strongly bonded at the time the recess for mounting an IC module is machined, and thus can be easily cut out, and its coating weight is low as described below, there is no need to particularly add an inorganic filler to this layer. As the particles of the thermoplastic resin used in the outermost layer, may be used particles of polyvinyl chloride, polyvinyl acetate, polyacrylates, polystyrene, polyethylene, etc. Particles of copolymers of monomers corresponding to these polymers may also be used.

The average particle size of the thermoplastic resin particles used in the present invention is preferably within a range of from 0.1 to 5 μm, more preferably from 0.2 to 2 μm, most preferably from 0.2 to 0.8 μm.

If the average particle size of the thermoplastic resin particles is too small, the resin particles penetrate into voids in the ink-receiving layer, so that the ink absorbency of the ink-receiving layer and the quality of an image to be formed on the ink-receiving layer tend to be deteriorated. If the average particle size is too great on the other hand, the surface of the resulting outermost layer is hard to be smoothed when it is subjected to a treatment for making non-porous after printing, so that the glossiness thereof is lowered.

The preferred embodiments of the IC card according to the present invention will hereinafter be described in more detail with reference to the accompanying drawings.

Figure 5:
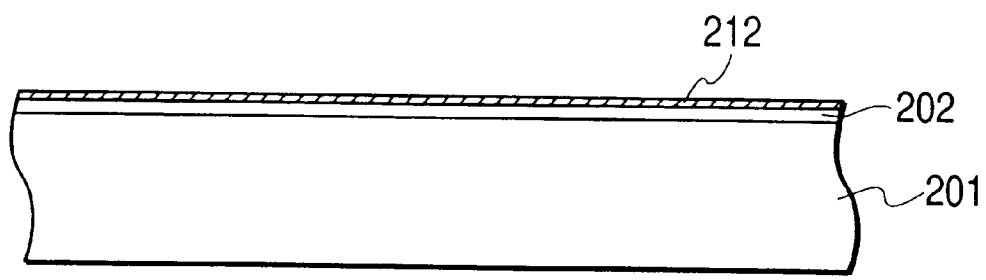
FIG. 5 illustrates an embodiment where an outermost layer is provided on an ink-receiving layer, and is a cross-sectional view illustrating a partial section of a card base provided with the outermost layer.

The porous layer containing such thermoplastic resin particles is formed by applying, as the outermost layer, a coating formulation prepared in such a manner that the solids content of the thermoplastic resin particles is preferably 10 to 50%, onto the ink-receiving layer previously provided. The amount of coating of the thermoplastic resin particles is preferably 2 to 10 μm in terms of film thickness, which is a thickness sufficient to impart good surface gloss to the resulting outermost layer by the treatment after printing, prevent the development of interference light and fully function as a protective layer. FIG. 5 illustrates a card on which such an outermost layer has been provided. In respective drawings, reference numeral 212 indicates the outermost layer.

Figure 2:
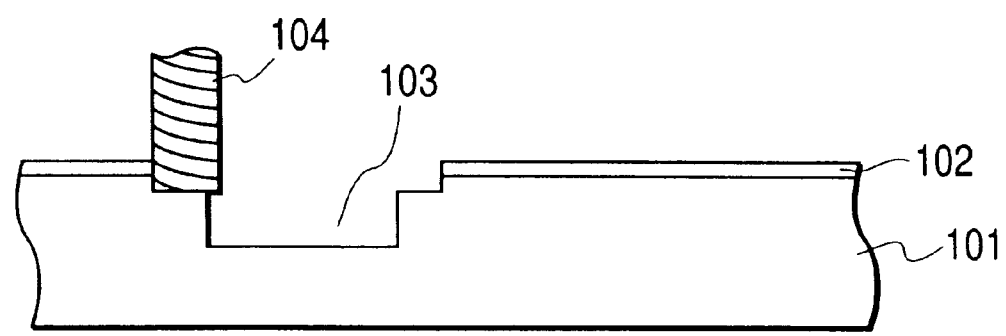
FIG. 2 is a cross-sectional view illustrating a partial section of the card base for explaining how to machine a recess for mounting an IC module by an end mill.
Figure 6:
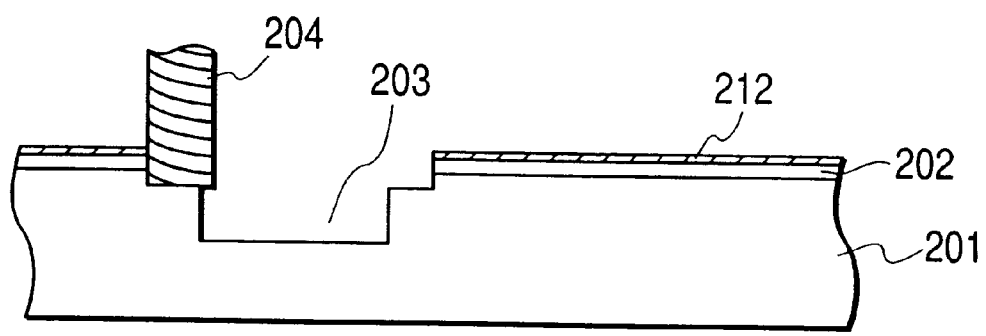
FIG. 6 is a cross-sectional view illustrating a partial section of the card base illustrated in FIG. 5 for explaining how to machine a recess for mounting an IC module by an end mill.

A recess (103 or 203) for mounting an IC module (107 or 207) is then formed in the card by machining. The machining is performed by milling using an end mill (104 or 204) (see FIG. 2 or FIG. 6). Since the inorganic filler is incorporated into the ink-receiving layer according to the present invention, the ink-receiving layer can be finely machined even when the card is machined through the ink-receiving layer, so that the occurrence of burr at the edge face of the ink-receiving layer is so little as to be negligible. Even when the machining is continuously performed, the adhesion of the resin component in the ink-receiving layer to the working tool is scarcely observed, so that the problem that reduction of machining speed and lowering of machining accuracy are incurred is hard to arise. Therefore, there is no need of deburring as post working. There is also no need to clean frequently tooling, so that a production process high in productivity can be realized.

Figure 3:
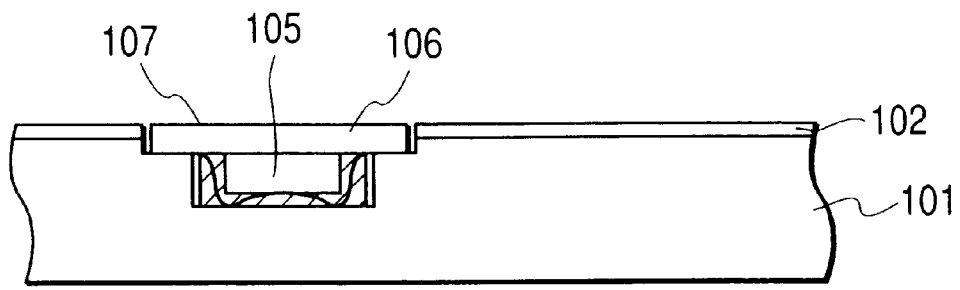
FIG. 3 is a cross-sectional view illustrating a partial section of an IC card in which an IC module has been mounted
Figure 7:
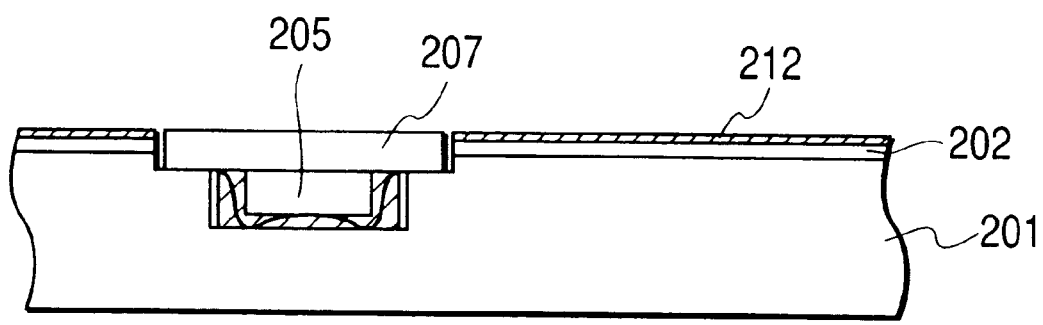
FIG. 7 is a cross-sectional view illustrating a partial section of an IC card in which an IC module has been mounted after the machining illustrated in FIG. 6.

An IC module is then mounted in this recess. The IC module is generally fabricated by forming an electrode pattern serving as an external terminal, and an circuit pattern connected to an IC chip electrode on a glass epoxy substrate, polyimide film substrate, polyester film substrate or the like, electrically conducting the face of the external terminal with the face of the circuit pattern by a through hole, mounting one or more IC chips (numeral 105 or 205 in the figures) on the substrate by a die bonding and wire bonding or face bonding or the like, and integrally sealing the parts with a resin. Such an IC module is jointed to the recess with an adhesive (not illustrated) to fabricate an IC card (see FIGS. 3, 7 and 8).

Information is recorded on each of the IC cards according to the present invention by forming images on the ink-receiving layer according to the information. In this case, an ink-jet system is preferred as the method for forming the images. Publicly known inks may be used as inks for conducting ink-jet recording on the IC card without any limitation. As coloring materials, soluble dyes typified by direct dyes, acid dyes, basic dyes, reactive dyes and food colors, and besides disperse dyes and pigments may be used without any particular limitation. In the case where great importance is attached to the weather fastness properties of the coloring materials, it is preferred to use a pigment dispersion. These coloring materials are generally used in a proportion of 0.1 to 20% in the conventional inks. This proportion may also apply to the present invention.

As a solvent used in the inks used in the present invention, water, a mixed solvent of water and a water-soluble organic solvent, or an non-aqueous solvent may be used without any problem. Taking safety, cost, etc. into consideration, the mixed solvent of water and the water-soluble organic solvent, which is generally used in inks for printers, is particularly preferred.

Figure 4:
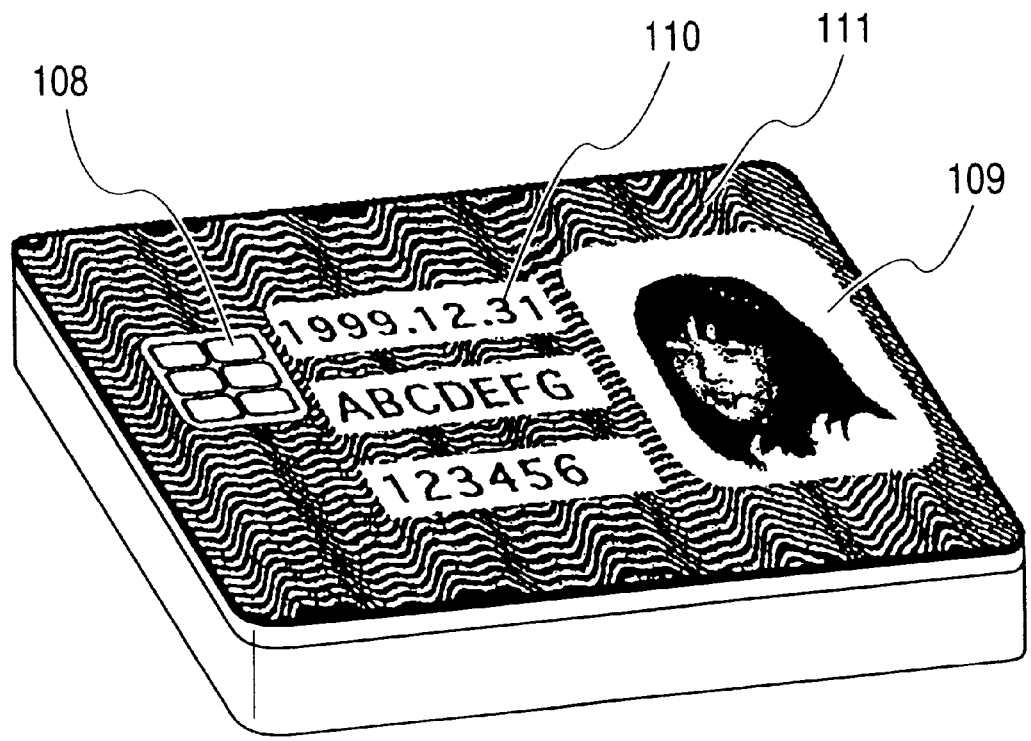
FIG. 4 is a schematic perspective view illustrating the appearance of an IC card on the surface of which printing has been made.

As an ink-jet recording method for applying the above-described inks to the IC cards according to the present invention to conduct recording, any system may be used so far as it is a method in which an ink can be ejected from a nozzle to apply the ink to the IC card as a target. In particular, an ink-jet printing system described in Japanese Patent Application Laid-Open No. 54-59936 (1979), in which an ink undergoes a rapid volumetric change by an action of thermal energy applied to the ink, so that the ink is ejected as ink droplets from a nozzle by the working force generated by this change of state, may be used effectively. FIG. 4 is a schematic perspective view illustrating the appearance of an IC card on the surface of which printing has been made in such a manner. In FIG. 4, reference numeral 108 indicates a contact terminal of a wiring board, and 109, 110 and 111 designs printed on the IC card.

Figure 8:
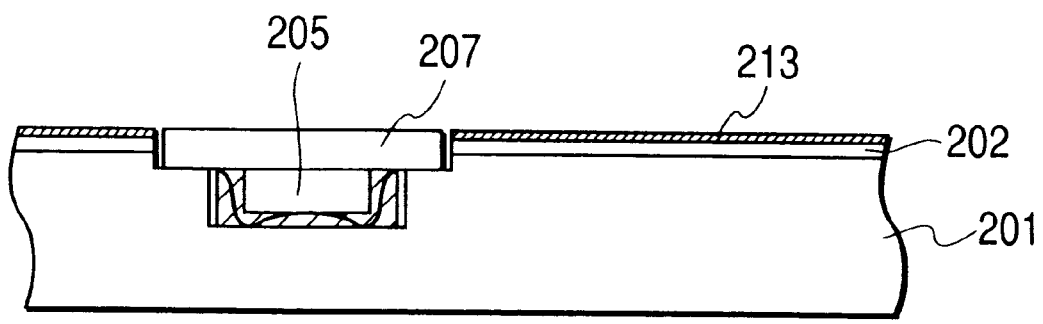
FIG. 8 is a cross-sectional view illustrating a partial section of the IC card the outermost layer of which has been made transparent after printing.

When the ink-receiving layer of the IC card according to the present invention is an ink-receiving layer having the outermost layer comprising the thermoplastic resin particles, a heat treatment is conducted after the printing to make the porous outermost layer non-porous. Such a treatment permits making the weather fastness properties such as water fastness and light fastness of the images printed good, imparting glossiness to the images and storing the print over a long period of time. The heating temperature at this time is preferably within a range of from 90 to 180° C. in view of the influence on the materials of the base, ink-receiving layer, inks, etc. and surface properties after making non-porous though it is also related to the time. In the case where the base is a material having a low softening point, such as a vinyl chloride resin, the base has a possibility of being deformed if the heating temperature exceeds 60 to 70° C. Therefore, when such a base is used, the heating is conducted in no contact with a heat source to irradiate only the surface of the card with heat rays such as infrared rays but the heating of the medium is conducted, thereby heating the outermost layer alone. Alternatively, the heat treatment is conducted in a short period of time using a heating laminator or the like. FIG. 8 illustrates an IC card subjected to such a treatment. Reference numeral 213 indicates an outermost layer made non-porous.

The present invention will hereinafter be described in more detail by the following examples. However, the present invention is not limited in any way by these examples.

EXAMPLE 1

Alumina hydrate (sol) having a needle (ciliary) structure was first synthesized as an inorganic filler by the hydrolyzing and deflocculating method of aluminum isopropoxide. Polyvinyl alcohol (PVA 117, trade name; product of Kuraray Co., Ltd.) and boric acid ($H_3BO_3$) were added in proportions of 10 parts by weight and 0.5 parts by weight per 100 parts by weight, in terms of solids content, of the alumina hydrate to prepare a coating formulation. This coating formulation was applied to a white rigid vinyl chloride resin sheet 500 mm×500 mm×0.74 mm in dimensions and dried at 60° C. for 20 minutes. The thickness of the ink-receiving layer formed was 40 µm after the drying. This resin sheet was held between flat ferro plates headed to 150° C. and treated for 5 minutes while applying a pressure of 1 $Kg/cm^2$. The resin sheet was then gradually cooled down to 40° C. over 1 hour. Thereafter, a card having a size of 80.6 mm×54.0 mm and a radius (R) of 3.0 mm at 4 corners was punched out of this resin sheet.

A recess for mounting an IC module was formed in the thus-obtained card by milling using an end mill. An IC module, in which an IC chip was die bonded in advance, electrical connection was made by wire bonding, sealing was made with a resin and its external shape was adapted for the recess, was joined to the recess with a thermosetting adhesive. BJ printing was conducted on the thus-obtained IC card by means of a BJ printer (Ink-Jet Printer BJC-700J, trade name) manufactured by Canon Inc. Ink cartridges used were BC-60 and BCI-62 Photo (both, trade names). The printing was conducted in accordance with a mode of hand feed by sticking the back side of the IC card on a cardboard. Images were printed up to the edge faces of the IC card except for the portion of the IC module.

Upon the formation of the recess, both occurrence of burr in the ink-receiving layer and adhesion of the resin component in the ink-receiving layer to the working tool to lower machinability were prevented. The images formed were clear or bright and their coloring materials were not rubbed off. The ink-receiving layer was not separated from the card base even after the card was immersed for 100 hours in tap water, and neither image disorder nor reduction of optical density was also observed. No change in appearance was observed even when the IC card was left to stand for 50 hours in an atmosphere of 40° C. and 90% relative humidity. Further, no problem arose in the operation of IC.

EXAMPLE 2

The same ink-receiving layer as in Example 1 was provided on a white rigid vinyl chloride resin sheet 500 mm×500 mm×0.74 mm in dimensions by using the same coating formulation as that used in Example 1 in accordance with the same process as in Example 1. Particles of polyvinyl chloride as thermoplastic resin particles (G-351, trade name, product of Nippon Zeon Co., Ltd.; vinyl chloride latex; film forming temperature: 100 to 110° C.) were applied as an outermost layer onto the ink-receiving layer by means of a wire bar so as to give a dry coating thickness of about 3 µm, and dried at 50° C. for 15 minutes. Thereafter, a card having a size of 80.6 mm×54.0 mm and a radius (R) of 3.0 mm at 4 corners was punched out of this resin sheet.

A recess for mounting an IC module was formed in the thus-obtained card by milling using an end mill. An IC module was joined to the recess with a thermosetting adhesive to fabricate an IC card. BJ printing was conducted on the thus-obtained IC card in the same manner as in Example 1. The IC card after the printing was passed through heated rubber rollers using a laminator to make the outermost layer non-porous. The treatment was conducted at a roller temperature of 150° C. and a feed speed of 60 mm/sec. Deformation of the IC card was scarcely observed, and the latex layer of the outermost layer was able to be made non-porous.

The formation of the recess was performed without causing the problem that burr occurs. The images formed were clear or bright and their coloring materials were not rubbed off. The ink-receiving layer was not separated from the card base even after the card was immersed for 100 hours in tap water, and neither image disorder nor reduction of optical density was also observed. No change in appearance was observed even when the IC card was left to stand for 50 hours in an atmosphere of 40° C. and 90% relative humidity. Further, no problem arose in the operation of IC.

EXAMPLE 3

The same ink-receiving layer as in Example 1 was formed on a white PETG sheet 200 mm×300 mm×0.10 mm in dimensions as a base by using the same coating formulation as that used in Example 1 in accordance with the same process as in Example 1. PETG sheets having thicknesses of 0.10 mm, 0.30 mm and 0.30 mm, respectively, were laid on top of this sheet. The thus-obtained laminate was held between flat ferro plates headed to 130° C. and treated for 5 minutes while applying a pressure of 0.5 Kg/cm². The laminate was then gradually cooled down to 40° C. over 1 hour. Thereafter, the coating and treatment of an outermost layer were conducted by the same process as in Example 2, and a card was punched likewise out of the thus-treated laminate.

A recess for mounting an IC module was formed in the thus-obtained card by milling in the same manner as in Example 2. Hereinafter, an IC module was mounted in the recess in the same manner as in Example 2 to fabricate an IC card. Further, ink-jet printing and the formation of a non-porous layer in the outermost layer were performed in the same manner as in Example 2 to prepare a printed IC card. As a result, an IC card similar to that in Example 2 was obtained. No problem arose in the formation of the recess.

EXAMPLE 4

An IC card was obtained in the same manner as in Example 2 except that a white ABS resin sheet having a thickness of 0.70 mm was used as a card base. Further, ink-jet printing and the formation of a non-porous layer in the outermost layer were performed in the same manner as in Example 2 to prepare a printed IC card. As a result, an IC card similar to that in Example 2 was obtained. No problem arose in the formation of the recess.

EXAMPLE 5

An IC card made of a metal base was obtained in the same manner as in Example 2 except that a stainless steel sheet having a thickness of 0.72 mm was used as a card base. Further, ink-jet printing and the formation of a non-porous layer in the outermost layer were performed in the same manner as in Example 2 to prepare a printed IC card. As a result, an IC card similar to that in Example 2 was obtained. No problem arose in the formation of the recess.

EXAMPLE 6

An IC card was obtained in the same manner as in Example 1 except that colloidal silica (Snowtex ST-N, trade name; product of Nissan Chemical Industries, Ltd.) was used as an inorganic filler used in the ink-receiving layer.

Further, ink-jet printing was performed in the same manner as in Example 1 to prepare a printed IC card. As a result, an IC card similar to that in Example 1 was obtained. No problem arose in the formation of the recess.

EXAMPLE 7

An IC card was obtained in the same manner as in Example 2 except that pigment inks were used as the inks. As a result, an IC card similar to that in Example 2 was obtained. No problem arose in the formation of the recess.

Comparative Example 1

An IC card was obtained in the same manner as in Example 1 except that the ink-receiving layer in Example 1 was changed to a layer of polyvinyl alcohol alone. As a result, burr occurred upon the formation of a recess in the ink-receiving layer. In addition, the resin in the ink-receiving layer began to adhere to the end mill little by little, and the machinability was gradually deteriorated.

According to the present invention, as described above, IC cards, on which individual information has been finely printed by ink-jet recording, can be provided with ease. Upon the formation of the recess for mounting an IC module by machining, both occurrence of burr in the ink-receiving layer and adhesion of the resin to the working tool are almost prevented, so that the productivity of the production process becomes high, and consequently the IC cards can be produced at low cost.

What is claimed is:

1. A card with a built-in electronic part, in which an ink-receiving layer is provided on at least one side of the card, and an electronic part is mounted in a recess formed in a surface of the card, characterized in that the ink-receiving layer contains an inorganic filler.

2. The card with the built-in electronic part according to claim 1, wherein the content of the inorganic filler in the ink-receiving layer is within a range of from 40% by weight to 98% by weight.

3. The card with the built-in electronic part according to claim 1 or 2, wherein the ink-receiving layer is a layer containing at least the inorganic filler and an organic resin, or a cured layer containing at least the inorganic filler and an organic resin.

4. The card with the built-in electronic part according to claim 1, wherein an image is formed on the ink-receiving layer according to information.

5. The card with the built-in electronic part according to claim 4, wherein the image is formed by an ink-jet system.

6. A process for producing a card with a built-in electronic part comprising the steps of:

providing an ink-receiving layer containing an inorganic filler on at least one side of the card, carrying out a cutting from a surface of the ink-receiving layer on the card to form a recess, and mounting an electronic part in the recess.

7. The process according to claim 6, wherein the content of the inorganic filler in the ink-receiving layer is within a range of from 40% by weight to 98% by weight.

8. The process according to claim 6 or 7, wherein the ink-receiving layer is a layer containing at least the inorganic filler and an organic resin, or a cured layer containing at least the inorganic filler and an organic resin.

9. The process according to claim 6, wherein an image is formed on the ink-receiving layer according to information.

10. The process according to claim 9, wherein the image is formed by an ink-jet system.

11. The process according to claim 10, wherein the ink-jet system is a system in which thermal energy is applied to an ink to eject a droplet of the ink.

* * * * *

UNITED STATES PATENT AND TRADEMARK OFFICE
CERTIFICATE OF CORRECTION

PATENT NO. : 6,250,555 B1
DATED : June 26, 2001
INVENTOR(S) : Tadayoshi Inamoto

It is certified that error appears in the above-identified patent and that said Letters Patent is hereby corrected as shown below:

Column 4,
Line 14, "one sides" should read -- one side --.

Column 5,
Line 58, "20 Kg/cm$^2_1$," should read -- 20 Kg/cm$^2$, --.

Column 6,
Line 61, "frequently" should read -- frequently used --.

Signed and Sealed this

Twenty-sixth Day of February, 2002

Attest:

JAMES E. ROGAN
Attesting Officer     Director of the United States Patent and Trademark Office